US010836514B2

(12) United States Patent
Combernoux et al.

(10) Patent No.: US 10,836,514 B2
(45) Date of Patent: Nov. 17, 2020

(54) STACKING DEVICE FOR A SPACE VEHICLE AND ASSOCIATED SPACE VEHICLE

(71) Applicant: THALES, Courbevoie (FR)

(72) Inventors: Thomas Combernoux, Le Cannet (FR); Alain-Vincent Blanc, Toulouse (FR); Christophe Duranti, Grasse (FR); Thierry Youssefi, Labastidette (FR)

(73) Assignee: THALES, Courbevoie (FR)

( * ) Notice: Subject to any disclaimer, the term of this patent is extended or adjusted under 35 U.S.C. 154(b) by 527 days.

(21) Appl. No.: 15/726,297

(22) Filed: Oct. 5, 2017

(65) Prior Publication Data

US 2018/0099767 A1 Apr. 12, 2018

(30) Foreign Application Priority Data

Oct. 6, 2016 (FR) ...................... 16 01448

(51) Int. Cl.
*B64G 1/64* (2006.01)
*B64G 1/22* (2006.01)
*B64G 1/44* (2006.01)

(52) U.S. Cl.
CPC ............. *B64G 1/645* (2013.01); *B64G 1/222* (2013.01); *B64G 1/443* (2013.01)

(58) Field of Classification Search
CPC ......... B64G 1/645; B64G 1/222; B64G 1/443
See application file for complete search history.

(56) References Cited

U.S. PATENT DOCUMENTS 4,347,023 A   8/1982  Rizos

FOREIGN PATENT DOCUMENTS

| FR | 2 768 401 A1 | 3/1999 |
| JP | H10-147298 A | 6/1998 |
| WO | 02/079034 A1 | 10/2002 |

*Primary Examiner* — Valentina Xavier
(74) *Attorney, Agent, or Firm* — BakerHostetler

(57) ABSTRACT

A stacking device for a space vehicle comprises a plurality of hold down and release mechanisms and is configured to hold, temporarily, n space appendages, n being an integer strictly greater than 2, on one and the same support of a space vehicle using hold down and release mechanisms. The stacking device is arranged such that several space appendages are held by one and the same hold down and release mechanism. An associated space vehicle comprising at least one such stacking device is also provided.

9 Claims, 5 Drawing Sheets

STACKING DEVICE FOR A SPACE VEHICLE AND ASSOCIATED SPACE VEHICLE

CROSS-REFERENCE TO RELATED APPLICATION

This application claims priority to foreign French patent application No. FR 1601448, filed on Oct. 6, 2016, the disclosures of which are incorporated by reference in their entirety.

FIELD OF THE INVENTION

The present invention relates to the space domain. The invention relates more particularly to a stacking device and an associated space vehicle.

BACKGROUND

Space crafts or space vehicles, such as, but in a nonlimiting manner, satellites or orbital stations in orbit around the Earth comprise space equipment, devices, intended to be deployed in space. Subsequently, such equipment will be called "space appendages". Space appendages should be understood to be solar generators, antennas, reflectors, mirrors, mats, or any other equivalent equipment.

During the launching and the stationing of a space vehicle, the various space appendages, which equip said vehicle, are subjected to significant stresses. In order to protect them during this phase, the space appendages are folded back and held temporarily on at least one face of the space vehicle in order to immobilize them. The appendages are stacked, that is to say held in storage configuration, on the space vehicle by a stacking device comprising several stacking points or hold down and release mechanisms also known by the acronym HRM. A space appendage hold down and release mechanism is composed primarily of an ejection system and a stacking tie rod tensioned by a stacking nut, intended to be fixed onto the body of the space vehicle. After the launching and stationing phase of the space vehicle, the ejection system of each hold down and release mechanism is actuated in order to release the space appendages and ensure their deployment.

Generally, during the launching and stationing phase, the space appendages are held on a support of the space vehicle, for example a face thereof, by at least three stacking points. When several space appendages are disposed on the same face of the space vehicle, each appendage is held by four other hold down and release mechanisms.

As in illustration, FIGS. 1a, 1b and 1c represent an example of a satellite face 15 on which are stacked two space appendages, namely, two antenna reflectors R1, R2. Each reflector is held on the case of the satellite by a stacking device comprising four different hold down and release mechanisms 10. The reflector R2 closest to the satellite is held, temporarily, by stacking points 10 directly fixed onto the face 15 of the satellite. The reflector R1 furthest away from the face 15 of the satellite is held by four other stacking points located a little more at the periphery and raised relative to the preceding four stacking points by raising means 11. Because of their height, these raised stacking points 10 are more bulky. Furthermore, in order to strengthen them and increase their stability, these raising means are provided with reinforcing bars 12 which further increase their bulk, their weight and the cost of the stacking device. These raising means 11 and reinforcing bars 12 also add new constraints with regard to the placement of hold down and release mechanisms 10 during the satellite design phase. Indeed, these stacking points must be arranged such that, during the mission, when the reflectors R1, R2 are deployed, the resident part of the hold down and release mechanisms 10, namely the stacking nuts, do not enter into the field of view of the emitting sources 13 with which the antenna reflectors R1, R2 cooperate. The raising means 11, reinforcing bars 12 and other additional devices must also be placed so as not to hamper the deployment of the reflectors R1, R2 after the launching and the stationing of the space vehicle.

Referring to FIG. 2, another problem arises when seeking to stack several space appendages on the same face of a space vehicle.

On one hand, increasing the number of hold down and release mechanisms 10, on one and the same satellite face or satellite wall, increases the layout constraints on this wall. The distribution of the hold down and release mechanisms 10 on the satellite wall must be done in a way compatible with the transmission of the constraints between the hold down and release mechanisms 10 and the structure of the space vehicle.

On the other hand, the width of the space vehicle must be increased to allow the positioning of the different stacking points without interference. Indeed, from a certain number of appendages, taking these constraints into account causes the backing structures 20 of the space appendages to be situated beyond the structure 21 of the space vehicle. It is then impossible to position the hold down and release mechanisms 10 on the space vehicle without using fixing devices cantilevered over the structure 21 of the vehicle, intended to receive the hold down and release mechanisms 10 which poses a new problem of weight, of bulk and of fragility. Currently, given the space constraints on the space vehicles, the number of appendages fixed onto one and the same face of a space vehicle is generally limited to two.

SUMMARY OF THE INVENTION

One aim of the invention is in particular to correct all or some of the drawbacks of the prior art by proposing a solution that makes it possible to stack two or more space appendages on one and the same space vehicle face while having a smaller number of HRMs compared to the current solutions.

To this end, the subject of the invention is a stacking device for a space vehicle, said device comprising a plurality of hold down and release mechanisms and being configured to hold, temporarily, n space appendages, n being, in this context, an integer strictly greater than 2, on one and the same support of a space vehicle using hold down and release mechanisms, said stacking device being configured such that several space appendages are held by one and the same hold down and release mechanism.

According to one embodiment, one and the same hold down and release mechanism is configured to hold two space appendages. According to one embodiment, each space appendage is held by four hold down and release mechanisms.

According to one embodiment, the hold down and release mechanisms are situated on a circle centred on the centre of the space appendages.

According to one embodiment, the hold down and release mechanisms are disposed at the periphery of the space appendages.

According to one embodiment, at least one hold down and release mechanism passes through at least one space appendage.

The features specific to these embodiments can be considered separately or in combination with one another.

Another subject of the invention is a space vehicle comprising n space appendages, n being an integer strictly greater than two, said space vehicle comprising at least one stacking device, as defined previously, configured to temporarily hold the space appendages on one and the same face of the space vehicle.

BRIEF DESCRIPTION OF THE DRAWINGS

Other particular features and advantages of the present invention will become more clearly apparent on reading the following description given in an illustrative and nonlimiting manner, and with reference to the attached drawings, in which.

DETAILED DESCRIPTION

The principle of the invention relies on a use of hold down and release mechanisms common to several space appendages in a stacking device in order to fix, temporarily, a number strictly greater than two, of space appendages on one and the same face of a spacecraft or a space vehicle.

Preferentially, but in a nonlimiting manner, the space vehicle is an artificial satellite.

Figure 1A:
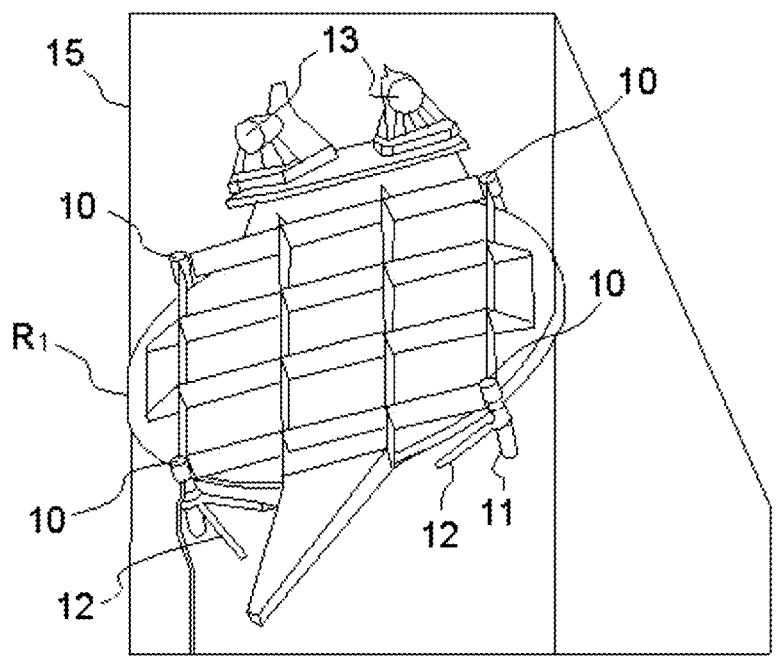
FIGS. 1a, 1b and 1c, already presented, represent an example of a satellite face on which two reflectors are stacked.
Figure 1B:
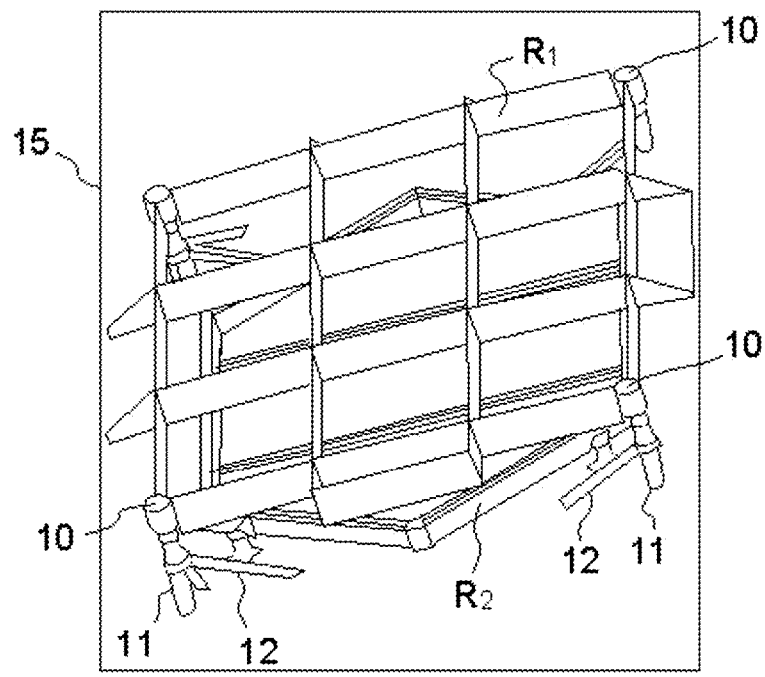
Figure 1C:
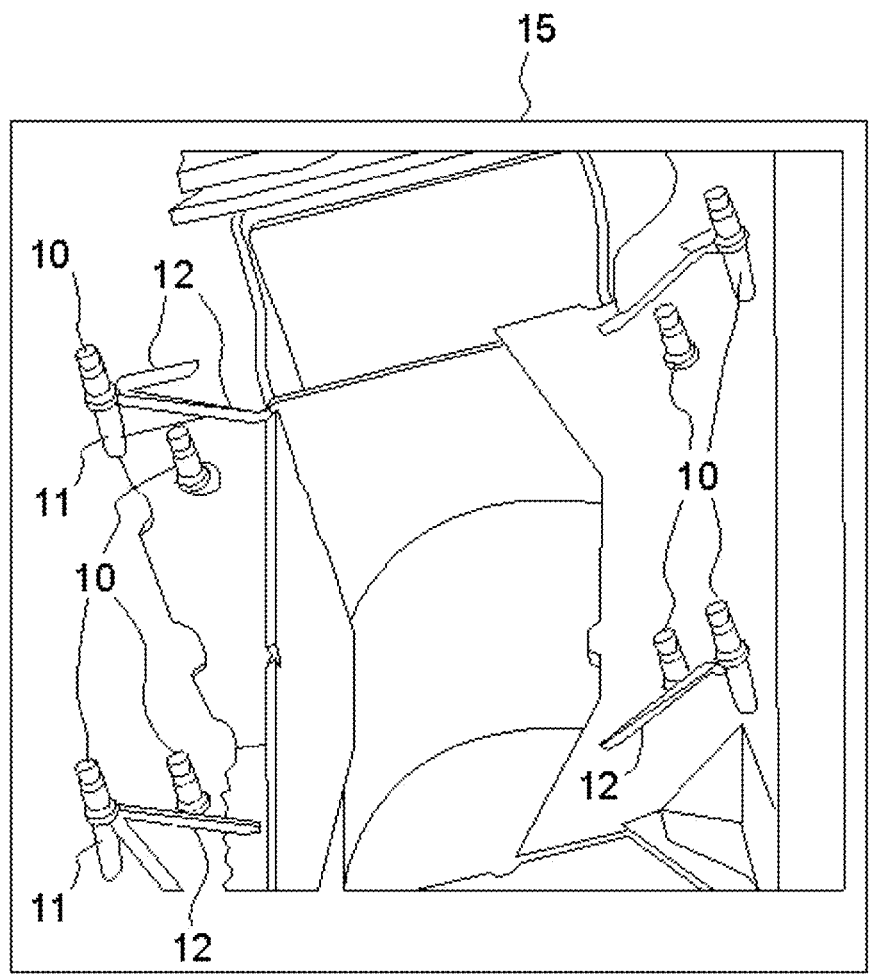
Figure 2:
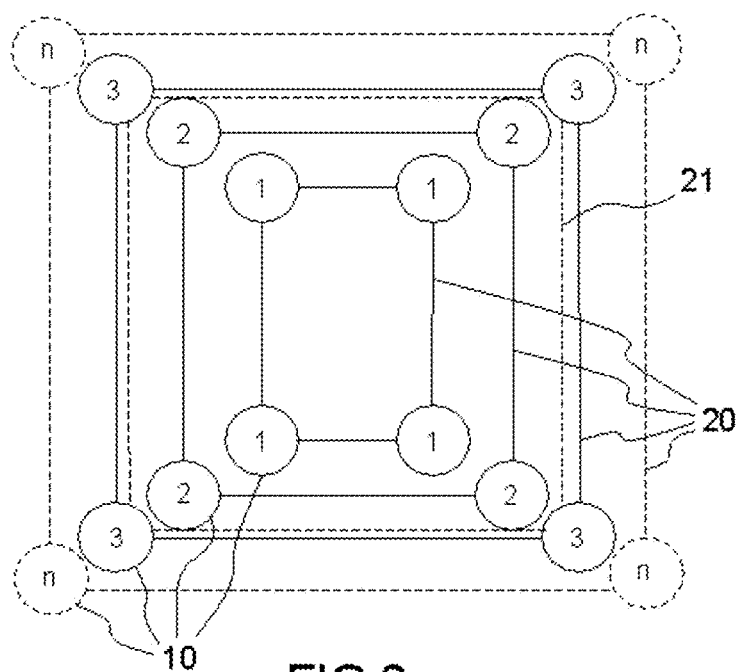
FIG. 2, previously cited, illustrates an example of positioning of hold down and release mechanisms in a configuration comprising several space appendages on one and the same space vehicle face.
Figure 3:
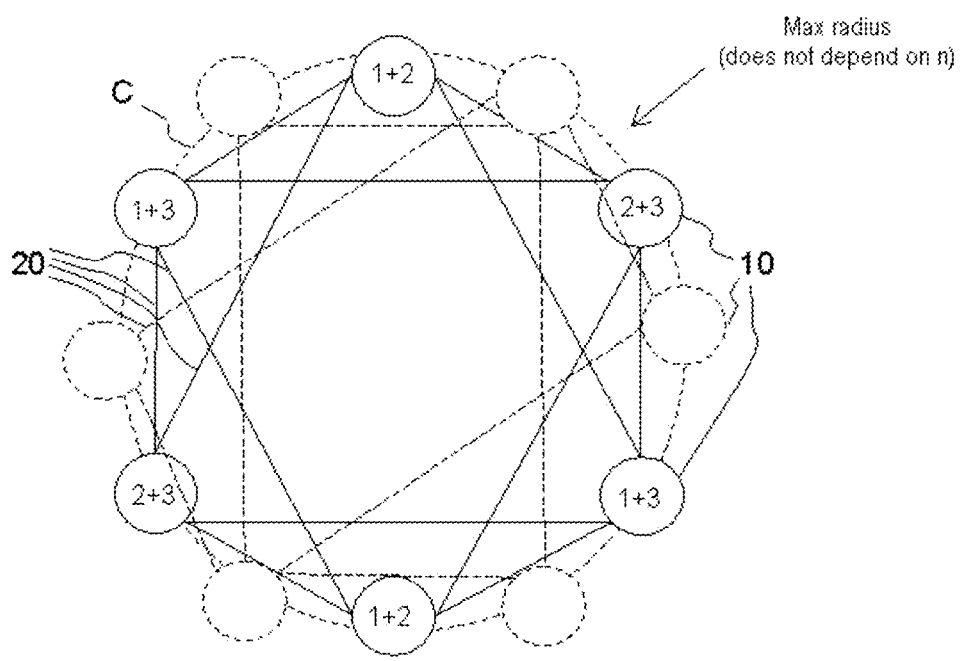
FIG. 3 represents an example of positioning of hold down and release mechanisms in a configuration comprising n space appendages on one and the same space vehicle face according to the invention.

FIG. 3 represents an example of configuration in which n space appendages, n being an integer strictly greater than 2, are partially superposed and fixed temporarily on one and the same space vehicle face. In order not to overload the figure, only the backing structures 20 of the space appendages are represented. In this configuration, the space appendages, and therefore their backing structure 20, are stacked one on top of the other and are held temporarily on a support of the space vehicle, positioned, for example, on a face thereof, using hold down and release mechanisms 10.

Advantageously, at least two space appendages can be held, temporarily, by one and the same hold down and release mechanism 10. The use of hold down and release mechanisms 10 common to several space appendages advantageously makes it possible to reduce the number of hold down and release mechanisms to be used and therefore to reduce the weight fixed onto the faces of the space vehicle. That makes it possible, also advantageously, to obtain more compact configurations.

According to a preferred embodiment, the hold down and release mechanism 10 is dimensioned for n−1 space appendages, out of the n space appendages mounted on one and the same support of the space vehicle. Thus, for example, if four appendages have to be stacked, one and the same hold down and release mechanism 10 will advantageously be dimensioned only for loads corresponding to just 3 appendages.

Another advantage resides in the fact that, according to the invention, all the hold down and release mechanisms 10 are of identical form and have the same height. Because of this, during the qualification phase of the hold down and release mechanisms, the qualification of just one of these mechanisms will be sufficient.

According to one embodiment, each space appendage is held temporarily on a support of the space vehicle using four hold down and release mechanisms 10 passing through bushings (not represented) fixed onto the backing structure 20 of each space appendage. These bushings give passage to the stacking tie rod.

According to one embodiment, when, for example, the different space appendages have similar shapes and dimensions, the hold down and release mechanisms 10 can be disposed at the periphery of the space appendages. Advantageously, this disposition makes it possible to simplify the access to the space appendages during the assembly, integration and test phases.

According to one embodiment, at least one hold down and release mechanism 10 can pass through at least one space appendage in its central part.

Alternatively, when the different space appendages have different shapes and/or dimensions, the hold down and release mechanisms 10 can be arranged in an overlap zone, common to the appendages, in order to fix these space appendages together.

As illustrated in FIG. 3, the space appendages can be stacked concentrically and the hold down and release mechanisms can be distributed over a circle C whose centre is substantially aligned on that of the circle of maximum radius which circumscribes the stacking of the different space appendages. In this configuration, the radius of the circle C, on which the hold down and release mechanisms 10 are aligned, does not depend on the number of space appendages stacked, but only on that on which the bushings are disposed on the backing structure 20 of each space appendage.

According to an alternative embodiment, the bushings, intended to be passed through by the hold down and release mechanisms, can be distributed according to an irregular or oblong disposition.

According to one embodiment, the hold down and release mechanisms 10 can be arranged uniformly over the structure 21 of the space vehicle. These hold down and release mechanisms 10 can, for example, be arranged uniformly on a circle.

According to one embodiment, the bushings of each space appendage can be disposed substantially identically on each of the supports 20 of the space appendages. For example, if each backing structure 20 of each space appendage forms a quadrangle, as illustrated in FIG. 3, the bushings can be disposed at each corner of the quadrangles.

According to a preferential embodiment, each stacking point holds two different space appendages. Advantageously, this limitation of the number of space appendages per hold down and release mechanism 10 makes it possible to reduce the height of each hold down and release mechanism 10. In this configuration, for n space appendages, 2n hold down and release mechanisms 10 are necessary to hold all of the space appendages on the space vehicle during the launch and stationing phase. If this solution is compared to the conventional solution consisting in immobilizing each space appendage by four hold down and release mechanisms, the proposed solution makes it possible to reduce by half the number of hold down and release mechanisms needed to stack of all of the space appendages. This makes it possible to produce a significant saving on bulk and on weight.

Figure 4A:
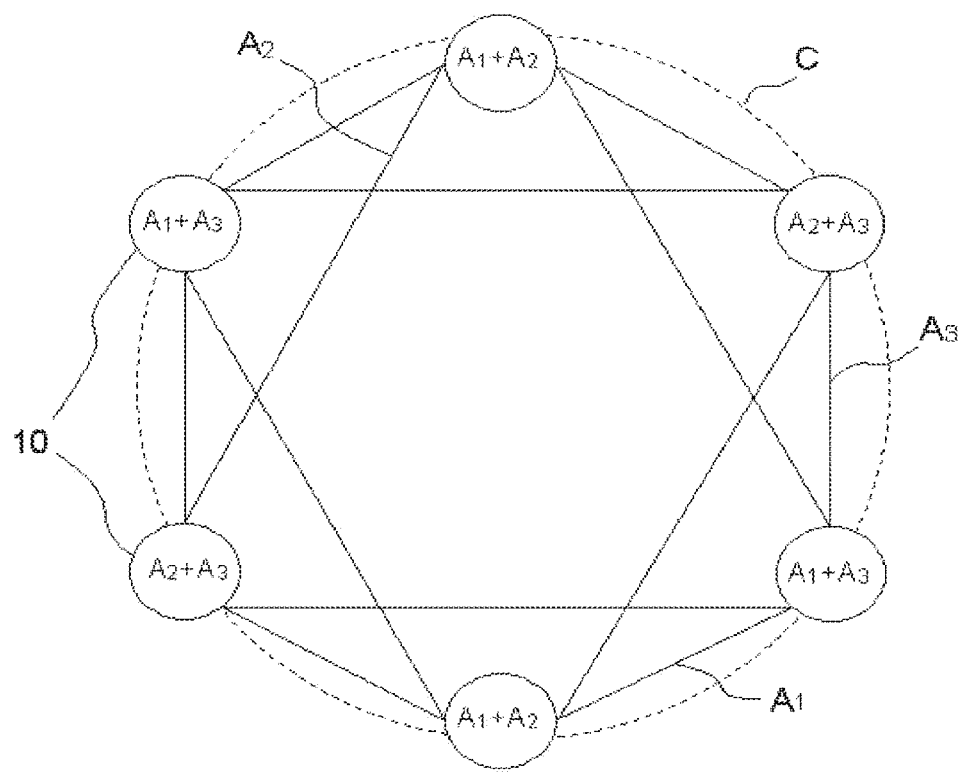
FIGS. 4a and 4b respectively represent an example of positioning of hold down and release mechanisms in a configuration comprising three space appendages on one and the same space vehicle face and an example of stacking of the space appendages on the hold down and release mechanisms for this same configuration.
Figure 4B:
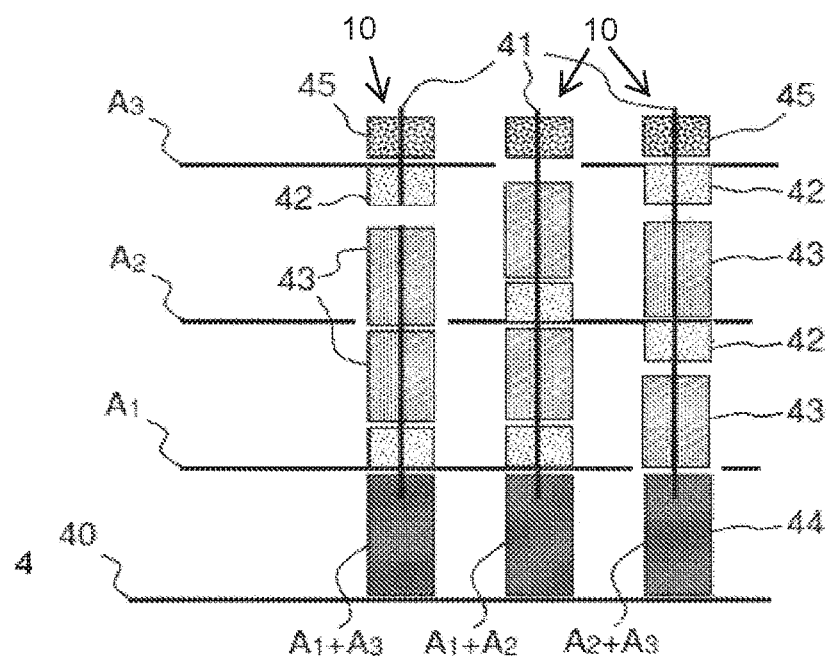

FIGS. 4 and 4b illustrate an exemplary embodiment of a stacking device making it possible to temporarily hold three space appendages on one and the same face of a space vehicle. In this embodiment, it is assumed that each space appendage is fixed by four hold down and release mechanisms 10 and that each mechanism 10 holds two different space appendages. For that, six hold down and release mechanisms are necessary.

FIG. 4a represents an example of positioning of the hold down and release mechanisms in a device for stacking space appendages. In this example, the backing structures 20 of the three space appendages are stacked concentrically and have a shape such that the hold down and release mechanisms can be distributed at the periphery of the space appendages on a circle C withe a centre substantially equal to that of the stacking. In this configuration, two identical hold down and release mechanisms 10 hold the appendages numbered A1 and A3, two others the appendages numbered A1 and A2 and two others the appendages numbered A2 and A3. The stacking device therefore has three different associations of hold down and release mechanisms 10. Generally, a stacking device intended to stack n space appendages, n representing an integer strictly greater than two, uses n different associations of hold down and release mechanisms 10.

As stated previously, the space appendages are held against the body 40 of the space vehicle in stacking configuration by stacking tie rods 41 using bushings 42 fixed onto the backing structures 20 of the space appendages and spacers or linking cylinders 43. The function of the linking cylinders 43 is to maintain the spacing between the different space appendages A1, A2, A3. Each stacking tie rod 41 is tensioned by a stacking nut 44 and an ejection system 45 makes it possible to release the space appendages and ensure their deployment after its activation.

FIG. 4b illustrates the possible combinations of bushings 42 and linking cylinders 43 in order to produce the different configurations of the hold down and release mechanisms 10 for this exemplary embodiment.

Figure 5:
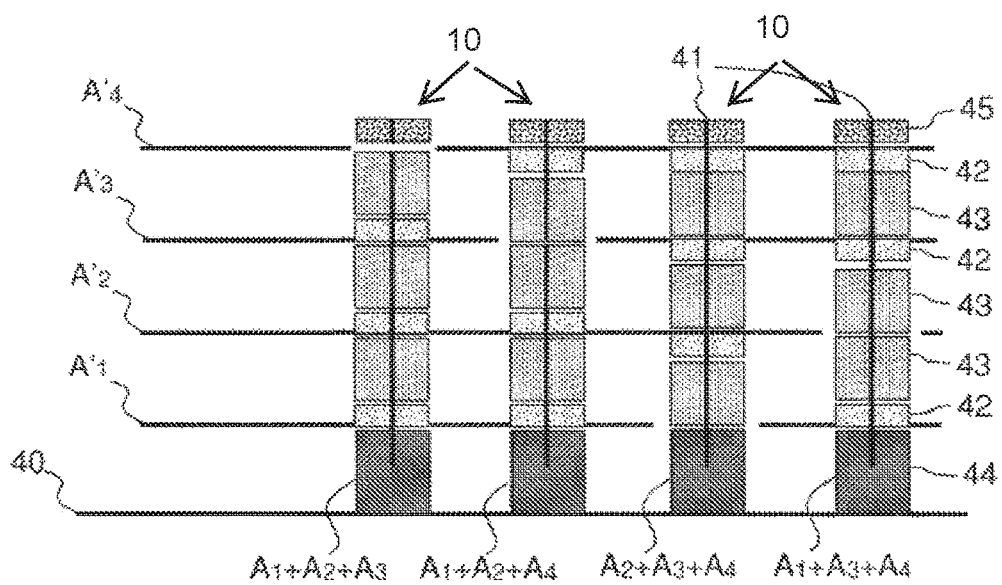
FIG. 5 represents an example of stacking of space appendages on its hold down and release mechanisms in a configuration comprising four space appendages on one and the same space vehicle face.

As an illustration, FIG. 5 represents an example of configuration of hold down and release mechanisms 10 in the case of a stacking of four space appendages A'1, A'2, A'3, A'4 on one and the same space vehicle face. In this embodiment, four different combinations of bushings 42 and linking cylinders 43 are necessary.

Another subject of the invention is a space vehicle comprising an integer number strictly greater than two of space appendages. The space vehicle comprises at least one stacking device as presented previously configured to temporarily hold in storage position at least three space appendages on one and the same face of the space vehicle.

The invention claimed is:

1. A stacking device for a space vehicle, said device comprising:
a plurality of hold down and release mechanisms configured to temporarily hold n space appendages in a stacked position on a support of a space vehicle, n being an integer greater than 2; and
a plurality of bushings, each bushing being located on a backing structure of one of the space appendages and allowing the fixing of one of the hold down and release mechanisms to one of the space appendages;
wherein each hold down and release mechanism is dimensioned and configured to maintain n−1 space appendages in a stacked position, and each of the other space appendages different from the space appendage concerned is held in position by at least one of the hold down and release mechanisms ensuring the holding of the space appendage concerned.

2. The stacking device according to claim 1, wherein, each hold down and release mechanism includes a stacking tie rod and spacers or linking cylinders passed through by said stacking tie rod, the stacking tie rod of each of the hold down and release mechanisms passing through at least one of the bushings so as to ensure the holding of the space appendages on which said bushings are mounted, the different spacers constituting each hold down and release mechanism being dimensioned and arranged with respect to the bushings passed through by the stacking tie rod so as to ensure that the spacing between the different space appendages held by the hold down and release mechanism concerned is maintained.

3. The stacking device according to claim 2, wherein each hold down and release mechanism further comprises a stacking nut allowing the tensioning of the stacking tie rod of said mechanism.

4. The stacking device according to claim 1, wherein each space appendage is held by four hold down and release mechanisms.

5. The stacking device according to claim 4, wherein, the number n of space appendages being equal to 3, each hold down and release mechanism is configured to ensure the holding of two space appendages.

6. The stacking device according to claim 1, wherein the hold down and release mechanisms are situated on a circle centered on the center of the space appendages.

7. The stacking device according to claim 1, wherein the hold down and release mechanisms are disposed at the periphery of the array of the space appendages.

8. The stacking device according to claim 1, wherein the hold down and release mechanisms are disposed in a zone of overlap common to the different space appendages.

9. A space vehicle comprising n space appendages, n being an integer greater than 2, said space vehicle comprising at least one stacking device according to claim 1 configured to temporarily hold the space appendages on a face of the space vehicle.

* * * * *